United States Patent
Leisching

(10) Patent No.: US 6,823,108 B1
(45) Date of Patent: Nov. 23, 2004

(54) OPTICAL ADD DROP AND DISPERSION COMPENSATION APPARATUS

(75) Inventor: Patrick Leisching, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/344,421
(22) PCT Filed: Aug. 10, 2000
(86) PCT No.: PCT/EP00/07810

§ 371 (c)(1),
(2), (4) Date: Jul. 28, 2003

(87) PCT Pub. No.: WO02/13425

PCT Pub. Date: Feb. 14, 2002

(51) Int. Cl.[7] ............................. G02B 6/26; G02B 6/28
(52) U.S. Cl. ........................................ 385/27; 385/24
(58) Field of Search ................. 385/27, 24; 398/81–83, 398/158

(56) References Cited

U.S. PATENT DOCUMENTS 6,631,246 B2 * 10/2003 Ford et al. ................... 398/158

FOREIGN PATENT DOCUMENTS

| EP | 0 795 973 | 9/1997 |
| FR | 1 014 607 | 6/2000 |
| WO | WO 97/23966 | 7/1997 |
| WO | WO 97/37446 | 10/1997 |

* cited by examiner

Primary Examiner—Frank G. Font
Assistant Examiner—Michael P. Mooney
(74) Attorney, Agent, or Firm—Bell Boyd & Lloyd LLC

(57) ABSTRACT

An optical add/drop apparatus and method wherein add/drop modules are designed into an optical add drop multiplexer such that channels are added/dropped without resorting to regeneration, with optical signals being routed into the add portion of the module which are not as dispersed as those optical signals being dropped, such that dispersion is compensated for while signal routing is facilitated.

10 Claims, 3 Drawing Sheets

Figure 5:
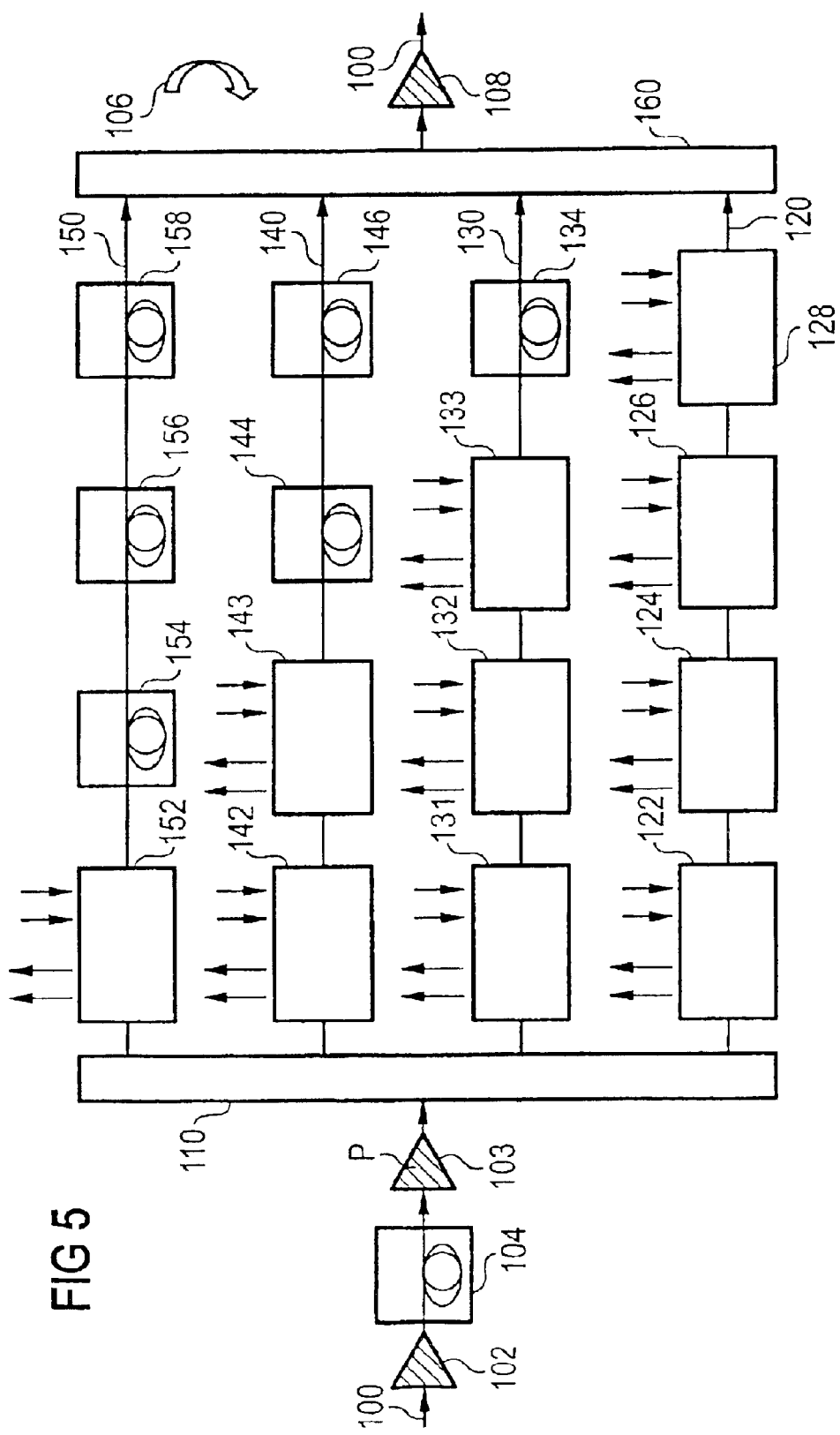

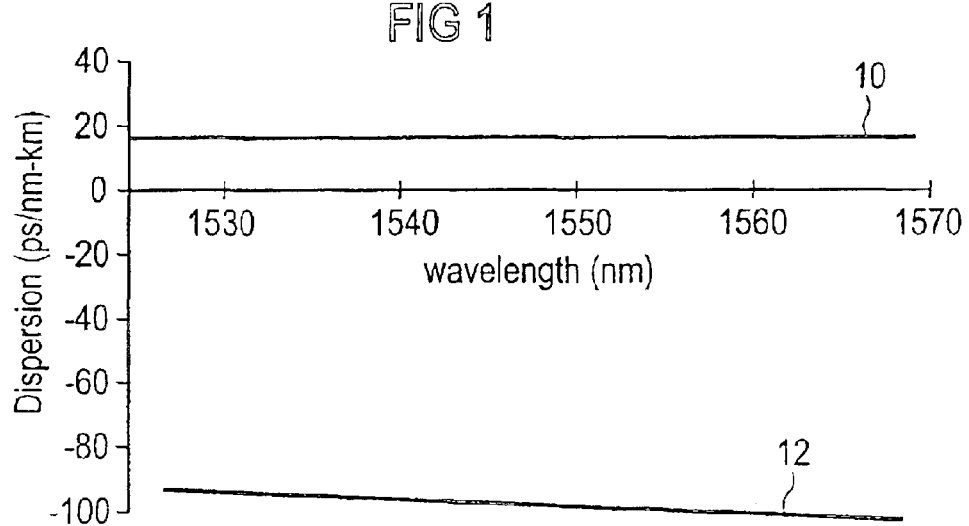
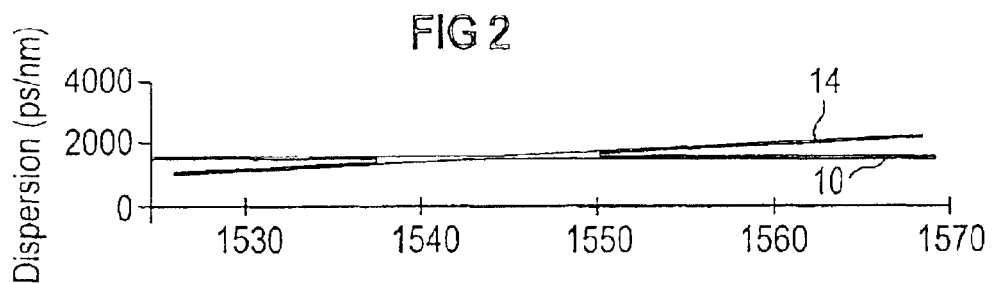
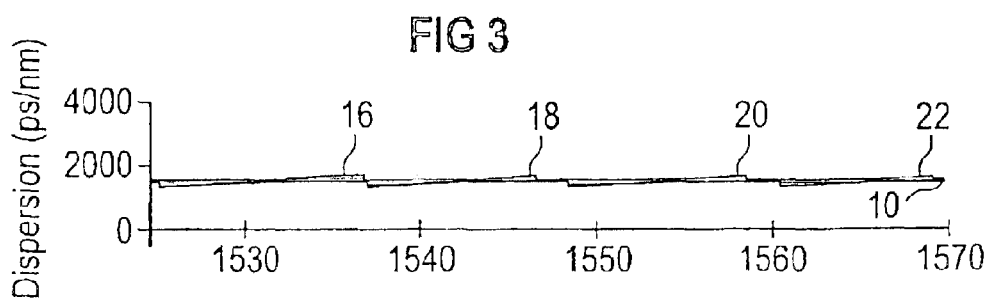

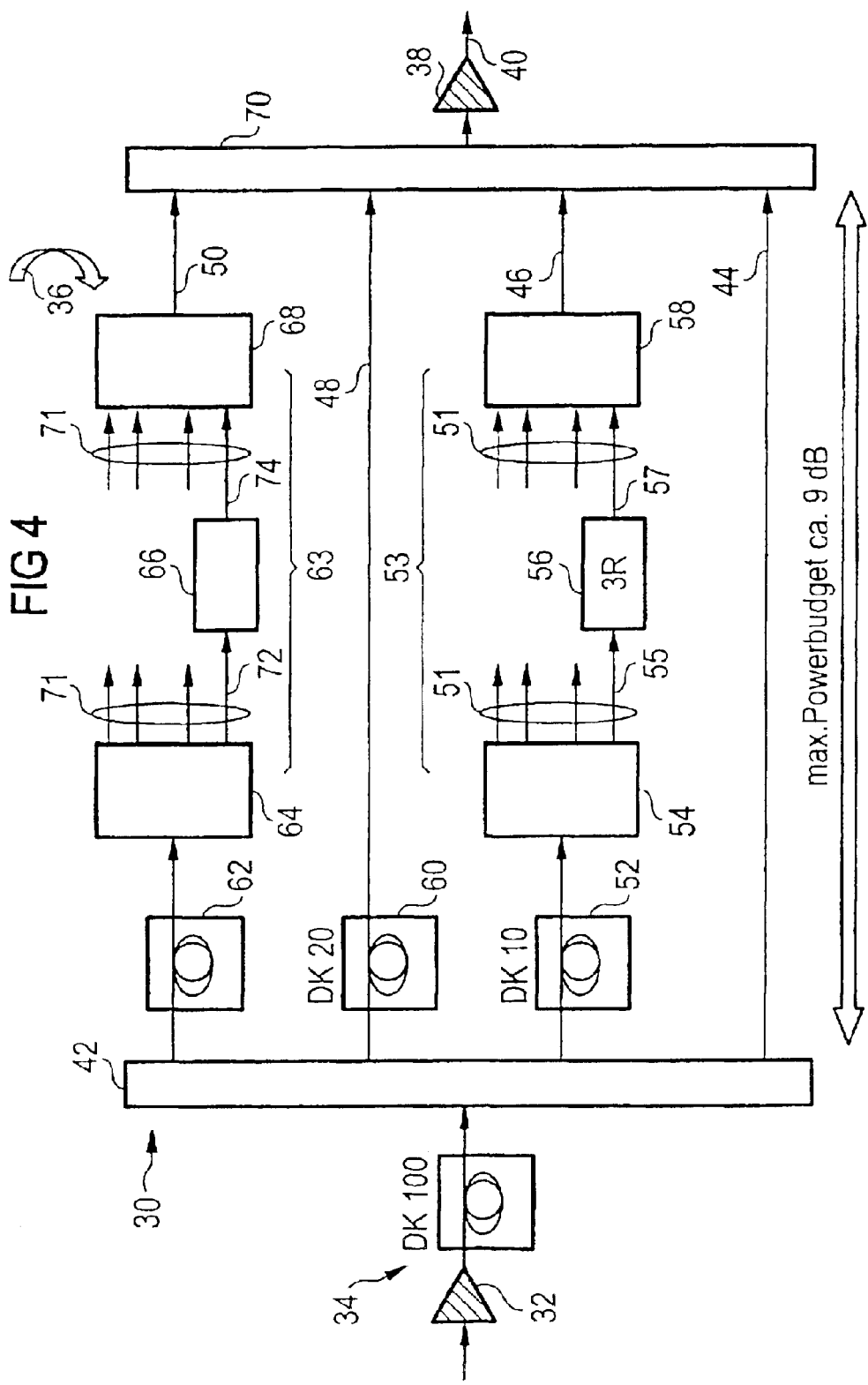

OPTICAL ADD DROP AND DISPERSION COMPENSATION APPARATUS

The present invention is directed to an add drop apparatus and method of using the same in wave division multiplexed (WDM) systems and more particularly to a method and apparatus of novel design for dispersion compensation and adding/dropping select signals.

Dispersion of light is a well-known natural phenomenon. It is well known that dispersion is problematic in the optical transmission arts. A standard single mode fiber, commonly used in optical transmission systems, has a wavelength of about 1550 nm and a group velocity dispersion of about 17 ps(nm-km). The dispersion causes high bit rate transmissions and transmissions over long distances to be distorted and become potentially indecipherable at the receiving ends. A second source of dispersion in fibers is non-linearities in the fiber whose destructive effects are brought about by the use of high optical transmission power required for transmission along longer transmission lines.

In the past, many solutions have been proposed to dispersion along long transmission lines. Use of dispersion compensation fiber modules are well known in the art. Such modules include several kilometers of wound optical fiber, the fiber normally having a negative dispersion of about 100 ps(nm-km). Judiciously applied throughout a transmission system, the fiber modules can compensate exactly the dispersion of a certain wavelength if the spread of the signal in the fiber is not influenced additionally by non-linear effects.

FIG. 1 sets out a graph with the x-axis representing wavelength and the y axis representing dispersion. A transmission fiber is depicted by line 10. The dispersion of the transmission line 10 is relatively and ideally flat because of the use of dispersion compensation fiber 17 ps(nm-km). Compensation fiber 12 is shown as having a dispersion of about −100 ps(nm-km). Placement of the compensation fiber on the transmission line also has an effect on suppression dispersion.

FIG. 2 depicts transmission line dispersion (y-axis units being in ps/nm). Herein, a 20 km dispersion compensation fiber was applied to 100 km of transmission fiber. The resulting graph depicts the dispersion line 14 of the transmission line below the ideal transmission line 10 of 1700 (ps-nm) at upto 1540 nm and at above line 10 at above 1550 nm. In fact, upwards of 1560 nm, the dispersion will begin to have deleterious effects on the transmission integrity. A proposed prior solution is to space dispersion compensation fiber at select locations in the transmission line.

FIG. 3 depicts the placement of four dispersion compensation fiber modules thereby creating four transmission line segments, 16, 18, 20, 22. As shown, each of the segments has minimal dispersion off of the ideal transmission line 10.

Long transmission line segments require large optical signal power to effect transmission. Large optical signal power inevitably causes non-linear effects and hence dispersion at the receiving end (e.g. self-phase modulation, cross phase modulation, and four wave mixing). Self-phase modulation is especially problematic given that it causes a frequency shift at the pulse edges of the signal to be transmitted and thus results in an additional influence on the signal by the dispersion fiber. Likewise, in WDM systems, several signals are transmitted on different wavelengths. Fluctuations in signal power is problematic because the WDM system provides for a variable number of channels at a constant overall optical power. Where power is lost from use of dispersion compensation fibers, additional amplifiers are required. Optical amplifiers are expensive and therefore are of limited application. Likewise, with the boosted power, an increase in the fiber non-linear properties occurs, thereby leading to more dispersion. Finally, there is the ever present need in the art to route and interconnect as many customer lines as possible in order to maximize use and revenue from the optical transmission system.

One proposed design solution is set out in U.S. Pat. No. 6,021,245. Herein a design solution to the above problem is the placement of fiber dispersion compensation modules (DK modules) before and after the optical amplifiers (pre and post compensation relative to the amplifier). DK modules are well known to one skilled in the art and are a common design feature of optical transmission systems. The net effect of this design is to reduce dispersion to substantially zero. However, such designs require many amplifiers of high optical output necessary to overcome the power losses from the compensation modules making this design expensive and unattractive. Likewise, it does not address the need in the art to route and interconnect as many customer lines as possible.

Another proposed design solution for overcoming non-linearities caused dispersion is the use of add drop modules in series with the DK modules. Add drop modules are well known in the art and operate to selectively add and/or drop select wavelengths of select channels. In some cases entire channels can be dropped and regenerated. The effect of dropping and adding select wavelengths and/or channels is to replace dispersed wavelengths with non-dispersed wavelengths. Hence, dispersed optical power is selectively removed and regenerated non-dispersed.

One such proposed designed is set out in FIG. 4, which incorporates an optical, add drop multiplexer therein. An optical add drop multiplexer, also called a Wavelength Add/Drop Multiplexer, or WADM is an optical network element that lets specific channels of a multi-channel optical transmission system be dropped and/or added without affecting the through signals (the signals that are to be transported through the network node). OADMs, like the electrical ADM counterparts, can simplify networks and lower the cost of network nodes by eliminating unnecessary demultiplexing of through signals. Herein, a portion of an optical transmission system 30 is depicted. The system comprises an optical preamplifier 32, a first DK module 34, an optical add drop multiplexer 36, and a booster amplifier 38 connected in series, respectfully, along the transmission line 40. The preamplifier, DK module, and booster amplifier are common elements well known to one skilled in the art. The multiplexer, as is known in the art, is selected for its capability of extracting or inserting lower-bit-rate signal from a higher-bit-rate multiplexed signal without completely demultiplexing the signal.

The multiplexer divides the transmission line 40 into parallel select groups of channels using a demultiplexing interleaver and group filter 42. Such filter and its use is also well known in the art. The filter type is intentionally selected by the system designer to provide access to desired channels and wavelengths which, as is known in advance, will require regeneration into a less dispersed and/or more replenished form. The wavelengths are carried in channels for which dispersion as a whole compensation may also be required. Where no dispersion compensation and/or regeneration is required, the channels can be designed to pass through the multiplexer 36 unchanged. A second need for access to the channels is to introduce new access from other transmission lines, thereby incorporating and/or rerouting additional customers. However, in the depicted system, dropped channels are simply regenerated.

Filter 42 is depicted multiplexing the transmission signal into four parallel groups of channels to be carried on four branch waveguides or transmission line segments 44, 46, 48, 50. The groups may consist of several channels each with at least one wavelength. A common number of channels may be 4 with a spacing of 150 GHZ. As is known in the art, the bandwidth may depend on the data rate. Line segment 50 contains no dispersion compensation nor add drop means. Herein, the designer relies upon DK module 34 to provide any compensation necessary for channels carried in this line segment. Line segment 46 includes a DK module 52 having 10 kilometers of wound optical fiber. An add drop module 53 is placed in series with DK module 52. Add drop module 53 includes a drop module 54, 3R signal regenerator 56, and add module 58, the function and use of each being well known to one skilled in the art. Drop module 54 operates to selectively drop at least one (55) of a group of channels 51 transmitted in line 46. Typical add drop modules can add drop 5–50% of the channels being routed therethrough. As depicted, a first channel 55 is selectively dropped from the group of channels 51. Channel 55 is then regenerated by regenerator 56 having no dispersion. The regenerated channel is then carried via waveguide 57 to add module 58. The add module 58 recombines the group of channels 51 and transmits them along branch waveguide 46 to multiplexer 70. Multiplexer 70 may also comprise an interleaver and group filter. The output power of line 46 may lose 1 dB as a result of the dispersion compensation via DK module 52. This loss can be made up by booster amplifier 38.

Branch waveguide 48 includes a DK module 60. As designed, module 60 includes 20 kilometers of wound optical fiber. Waveguide 48 includes no other compensation or add drop means thereby indicating that the designer intended that the channels being carried on this line segment require no regeneration nor add/dropping. The optical power is down about 2 dB, which may be made up by booster amplifier 38.

Branch waveguide 50 includes a DK module 62 having 30 kilometers of wound optical fiber. The line segment further includes add drop module 63 which functions essentially the same as add drop module 53. Herein drop module 64 separates the channels being carried along this line segment into smaller parallel groups or individual channels (line segments) 71. A first channel (line segment) 72 of the smaller group is directed to regeneration means 66 which regenerates the first channel to then be carried along line segment 74 to add module 68. Add module 68 recombines the channels being carried on line segments 71 and routes them along line segment 50 to multiplexer 70. The optical power loss along this line segment is about 3 dB, which may be made up by booster amplifier 38.

The above described prior art design has at least the disadvantage of including the use of 3R regeneration means (or their equivalents) in that such means require the optical/electrical/optical conversion of the signal for its regeneration. Such conversion is complicated and costly. Likewise, the need of customer connectivity is not addressed.

The International Application WO 97/23996 describes a wavelength division multiplex transmission system with branching (add-drop) units inserted in an optical fiber trunk. None-dispersion shifted fibres are used for compensating the dispersion occurring in the trunk. In the branch there is provided means for pre-dispersing the wavelength off the add-channel prior to routing to the trunk and means for dispersing the drop wavelength. For through channels (which are not dropped) there is only a rough compensation possible and depending of the amount of compensation the power level of the channels may become excessively different. This application represents the most relevant prior art.

The object of the present invention is to provide an optical transmission system wherein dispersion can be compensated while costs due to regeneration and optical/electrical conversion is minimized and/or eliminated. The compensation is effected without the use of individual line generators such as the prior art 3R generator. Finally, the present invention facilitates a higher number of interconnections than the prior art apparatus, thereby adding value to the transmission system in which the present invention may be incorporated.

These objects are achieved by means of an apparatus and method in which add/drop modules are designed into an optical add drop multiplexer such that channels are added/dropped without resorting to regeneration. Rather, optical signals are routed into the add portion of the module, the signals originating from outside multiplexer. The newly added optical signals may originate from other customers/sites. The newly added signals are not as dispersed as those being dropped, thereby compensating for dispersion while facilitating signal (re)routing.

This object is further achieved by the conscious design and select implementation of dispersion compensators particular to the known dispersion of a branch waveguide. By this design, branch waveguides with higher dispersion will have a higher number of DK modules and visa versa. Likewise, the number of add drop modules implemented is made dependent upon known dispersion values. By this arrangement, the output optical power of each branch waveguides is made substantially similar.

The figures represent only the component parts of the optical transmission system necessary for the understanding of the present invention. Missing components include signal processing means at receiving and transmitting ends, fiber connection means, etc.

FIG. 5 sets out an embodiment of the present invention. Herein, a first and second preamplifier 102, 103 oppose and are serially connected with a common DK module 104 along an optical transmission line 100 of a WDM system. By way of example, as depicted, DK module 104 includes 100 kilometers of wound optical fiber. An asymmetric optical add drop multiplexer 106 (OADM) is serially connected, via transmission line 100, downstream to the second preamplifier 103. A common booster amplifier 108 is serially connected downstream from the OADM 106. The OADM comprises opposing demultiplexer and multiplexer elements 110 and 160 respectively, The demultiplexer and multiplexer elements may comprise interleaver and group filters or other equivalent elements as known to one skilled in the art to provide access to desired channels and wavelengths which, as will be known in advance, will require replacement into a less dispersed form. The wavelengths are carried in channels for which dispersion as a whole compensation may also be required. Where no dispersion compensation and/or replacement is required, the channels can be designed to pass through the multiplexer 106 unchanged. Demultiplexer 110 divides the transmission signal, being carried on transmission line 100, into a select number of parallel subgroups, each comprising a select number of channels. The number of subgroups and channels therein is a matter of design choice within the scope of the invention. By way of example, up to 8 channels with 8 different wavelengths per group are depicted in FIG. 5. However, the number of channels may range from at least 2–40 with a spacing of at least 50–200 GHz. Herein, as depicted, demultiplexer 110 divides the transmission signal into 4 parallel subgroups. Each of the subgroups is carried on one of four branch waveguides or line segments 120, 130, 140, 150. Each of the line segments includes a number of elements selected to optimize the operating optical power budget of the OADM 106.

As is known in advance from the design of the OADM, signals carried by waveguide 120 will require little dispersion compensation. As such, for these signals, the apparatus relies upon the common DK module 104. Given the low dispersion requirements for this waveguide, the designer is afforded the opportunity to include a plurality of add-drop-modules The plurality of add-drop-modules facilitates the interconnection with other waveguides thereby providing interconnectivity with other customer sites. The interconnectivity is enhanced over prior art designs, which relied upon regeneration rather than substitution of signals. The add-drop-modules further operate to attenuate the optical power of the signals in the channels being carried by the respective waveguide such that the output power of all of the OADM branch waveguides is made substantially similar. Having substantially similar output power facilitates multiplexing, amplification, and transmission. The plurality of add-drop-modules further enhances the instant designs benefit to the transmission system by providing enhanced connectivity. The enhancement is also of economic value to the transmission system operator in that more customers can be connected to his/her transmission system.

As depicted, branch waveguide 120 includes four add-drop-modules 122, 124, 126, 128. Each module includes means (not shown) to connect with other waveguides such that a select number of channels may be dropped and added by design choice and/or customer needs. The modules are selected such that the combined dropped and added channels result in an output optical power of waveguide 120 being substantially similar to optical power of the other OADM waveguides and wherein the dispersion of the exiting signals is substantially minimized (e.g. zero dispersion). Add drop modules 122, 124, 126, 128 differ from those previously used in optical add drop multiplexers in that the instant modules route optical signals without the intermediate step of converting the optical signals into electrical signals. The instant modules may comprise an optical circulator and programmable fiber Bragg gratings, and/or other wavelength based splitting arrangement known to one skilled in the art wherein, by way of example, 2 dB can be dropped per module. With an exemplary optical powerbudget of 9 dB, the instant design incorporates 4 add drop modules to drop upwards of 8 dB if so designed. Branch waveguide 120 does not include any DK modules because the system is designed to route signals through this waveguide having a dispersion level that is acceptable for transmission reception thereby requiring no DK module compensation. This design is facilitated by appropriate selection of demultiplexer 110. The output of branch waveguide 120 is directed to multiplexer 160 which serves to combine the waveguide output with other waveguides so as to provide a single set of signals to be transmitted along transmission line 100.

Branch waveguide 130 includes a lesser number of add drop modules then waveguide 120. Herein, waveguide 130 includes three add drop modules 131, 132, 133. The add drop modules operate in essentially the same manner as the above add drop modules, 122, 124, 126 and 128. Herein a DK module 134 is serially connected with modules 131, 132, 133. The number of add drop and DX modules is selected so that the power output of the waveguide 130 is substantially similar to the power of the other OADM waveguides. The DK module operates substantially similar to known DK modules. The system is designed with the intent of routing signals/channels through this waveguide which require little dispersion compensation that is to be effected by DK module 134. Herein, the module 134 includes 10 kilometers of optical fiber and the power loss from this module does not significantly degrade the overall power output of the waveguide. The output of waveguide 130 is routed to multiplexer 160 for multiplexing with output from the other OADM waveguides.

It is known from the optical system design that branch waveguide 140 will require more dispersion compensation than waveguides 120 and 130 and therefore less optical power attenuation is possible. As such, waveguide 140 is designed to include two DK modules, in place of the one DK module of waveguide 130 and two add-drop-modules in place of the three from waveguide 130. As such, waveguide 140 is designed as having add-drop-modules 142, 143 and DK modules 144, 146. As a result of this design, the optical power output of waveguide 140 is made to be substantially similar to the output of the other OADM waveguides, while the dispersion is reduced to operational satisfactory levels for acceptable reception at a receiving end of the transmission line 100.

Finally, it is known from the optical system design, that signals carried by waveguide 150 will require more dispersion compensation than previous waveguides and less optical power attenuation than the other OADM waveguides. As such, waveguide 150 includes three DK modules 154, 156, 158 and one add drop module 152. The add drop and DK modules operate in a substantially similar manner to those modules described above. As such, by this design the output power of waveguide 150 is substantially similar to the other OADM waveguides while the dispersion is substantially reduced to acceptable levels. The output is multiplexed with the outputs of the other waveguides at multiplexer 160 for transmission along line 100.

Optical power loss incurred in OADM 106 is made up for by common booster amplifier 108 positioned downstream of the OADM.

As a design alternative, in certain embodiments a number of attenuators may be substituted for add drop modules since attenuators can be made to perform essentially similar functions to the add drop modules described in connection with the invention, namely, reducing the amplitude of a signal without appreciably distorting its waveform. Optical attenuators are generally passive devices requiring no intermediate step of converting the optical signal into an electrical signal. Likewise, the degree of attenuation may be fixed, continuously adjustable, or incrementally adjustable.

Although the invention has been shown and described with respect to an exemplary embodiment thereof, it should be understood by those skilled in the art that the foregoing and various changes, omissions, and additions in the form and detail thereof may be made therein without departing from the spirit and scope of the invention.

The invention claimed is:

1. An add/drop apparatus attached to a transmission line of a WDM optical transmission system, comprising:

a divider for dividing a WDM signal into a plurality of different signal bands having respectively different dispersion values;

a plurality of branch waveguides, wherein the divider passes the signal bands over the plurality of branch waveguides;

a plurality of optically-communicating add/drop modules and dispersion-compensating modules, wherein each branch waveguide includes a plurality of the add/drop modules and dispersion-compensating modules connected in series; and a combiner for combining the signal bands to an altered WDM signal;

wherein the branch waveguides carrying signal bands of higher dispersion, as compared to the remaining signal bands of the remaining branch waveguides, include dispersion-compensating modules of higher attenuation than the remaining branch waveguides and include a lesser number of the add/drop modules as compared to a number of add/drop modules in each of the remaining branch waveguides, such that a respective power output level of each of the branch waveguides is substantially similar.

2. An add/drop apparatus as claimed in claim 1, further comprising at least one common dispersion-compensating module serially connected before the divider, wherein at least one of the branch waveguides includes no dispersion-compensating modules, and dispersion compensation for the at least one of the branch waveguides is carried out by the at least one common dispersion-compensating module.

3. An add/drop apparatus as claimed in claim 1, further comprising an attenuation module in at least one of the branch waveguides.

4. An add/drop apparatus as claimed in claim 1, wherein a number of the add/drop modules and the dispersion/compensating modules are particularly selected for each of the branch waveguides such that a combined attenuation of all of the signal bands of each of the branch waveguides is substantially similar.

5. An add/drop apparatus as claimed in claim 4, wherein the add/drop modules may substitute a number of first channels by second channels, with the first and second channels being of a same wavelength.

6. An add/drop apparatus as claimed in claim 1, wherein each of the branch waveguides includes a respectively different number of add/drop modules and dispersion-compensating modules.

7. An add/drop apparatus as claimed in claim 2, wherein the dispersion-compensating modules for each of the branch waveguides and the at least one common dispersion-compensating module have an adopted dispersion value.

8. A method for dispersion compensating of WDM signals carried on a transmission line of a WDM optical transmission system including a plurality of optically-communicating add/drop modules and dispersion-compensating modules, the method comprising the steps of:

dividing a WDM signal into different signal bands to be carried on respectively different branch waveguides, wherein the signal bands have respectively different dispersion values;

placing dispersion compensation modules of higher attenuation in the branch waveguides carrying signal bands of higher dispersion than the other branch waveguides carrying signal bands of lower dispersion, and placing a higher number of the add-drop modules in the branch waveguides carrying signal bands having lower dispersion values than the other signal bands carried on the other branch waveguides having higher dispersion values, such that a respective power output level of each of the branch waveguides is substantially similar;

passing the signal bands over the respectively different branch waveguides, and combining the signal bands to an altered WDM signal to be carried over the transmission line.

9. A method for dispersion compensation of WDM signals as claimed in claim 8, the method further comprising the step of placing a common dispersion compensation module upstream of parts which perform the step of dividing, wherein the common dispersion-compensating module provides dispersion compensation for at least one of the branch waveguides which includes no dispersion-compensating module.

10. A method for dispersion compensation of WDM signals as claimed in claim 8, wherein the add/drop modules may substitute a number of first channels for second channels, with the first and second channels being of a same wavelength, wherein the step of placing the dispersion-compensating modules further includes the step of using the dispersion-compensating modules for each of the branch waveguides having an adopted dispersion value.

* * * * *